(12) United States Patent
Bensmann

(10) Patent No.: US 11,577,819 B2
(45) Date of Patent: Feb. 14, 2023

(54) WING FOR AN AIRCRAFT

(71) Applicant: Airbus Operations GmbH, Hamburg (DE)

(72) Inventor: Stefan Bensmann, Hamburg (DE)

(73) Assignee: Airbus Operations GmbH

( * ) Notice: Subject to any disclaimer, the term of this patent is extended or adjusted under 35 U.S.C. 154(b) by 493 days.

(21) Appl. No.: 16/604,266

(22) PCT Filed: Apr. 17, 2018

(86) PCT No.: PCT/EP2018/059763
§ 371 (c)(1),
(2) Date: Oct. 10, 2019

(87) PCT Pub. No.: WO2018/197265
PCT Pub. Date: Nov. 1, 2018

(65) Prior Publication Data
US 2020/0148331 A1    May 14, 2020

(30) Foreign Application Priority Data

Apr. 28, 2017  (DE) ..................... 10 2017 004 090.7
Oct. 24, 2017  (DE) ..................... 10 2017 124 793.9

(51) Int. Cl.
*B64C 9/24* (2006.01)
*B64C 3/18* (2006.01)
*B64C 9/02* (2006.01)

(52) U.S. Cl.
CPC ............... *B64C 9/24* (2013.01); *B64C 3/185* (2013.01); *B64C 9/02* (2013.01)

(58) Field of Classification Search
CPC ............... B64C 9/22; B64C 9/24; B64C 9/26
See application file for complete search history.

(56) References Cited

U.S. PATENT DOCUMENTS 2,938,680 A   5/1960   Greene et al.
3,272,458 A   9/1966   Bracka
(Continued)

FOREIGN PATENT DOCUMENTS

CN   102007036 A   4/2011
CN   102046466 A   5/2011
(Continued)

OTHER PUBLICATIONS

Russian Search Report for Application No. 2019138316, dated Aug. 25, 2020, pp. 1-2.
(Continued)

*Primary Examiner* — Timothy D Collins
*Assistant Examiner* — Eric Acosta
(74) *Attorney, Agent, or Firm* — Lerner, David, Littenberg, Krumholz & Mentlik, LLP

(57) ABSTRACT

A wing for an aircraft includes: a main wing having an outer skin defining an interior space of the main wing, a slat, and a connection assembly for movably connecting the slat to the main wing, such that the slat is movable in a predefined motion between a retracted position and at least one extended position. The connection assembly includes an elongate and curved slat track, wherein a first end section of the slat track is connected to the slat, a first bearing at least partly arranged outside the interior space of the main wing, a second bearing spaced apart from the first bearing and arranged within the interior space of the main wing. The slat track is movably and rotatably supported on the main wing by the first and second bearing, such that the first and second bearing support the predefined motion.

16 Claims, 4 Drawing Sheets

(56) References Cited

U.S. PATENT DOCUMENTS

| | | | |
|---|---|---|---|
| 3,940,093 | A | 2/1976 | Cabriere |
| 4,360,176 | A | 11/1982 | Brown |
| 4,471,928 | A | 9/1984 | Cole |
| 4,753,402 | A | 6/1988 | Cole |
| 4,880,189 | A | 11/1989 | Day |
| 5,039,032 | A | 8/1991 | Rudolph |
| 5,544,847 | A | 8/1996 | Bliesner |
| 2007/0102587 | A1 | 5/2007 | Jones et al. |
| 2010/0116944 | A1 | 5/2010 | Wollaston et al. |
| 2011/0036944 | A1 | 2/2011 | Mann |
| 2011/0042525 | A1 | 2/2011 | Parker |
| 2011/0168849 | A1 | 7/2011 | Parker |
| 2015/0090843 | A1 | 4/2015 | Guering |

FOREIGN PATENT DOCUMENTS

| | | |
|---|---|---|
| CN | 102056795 A | 5/2011 |
| CN | 102143886 A | 8/2011 |
| EP | 2116467 A1 | 11/2009 |
| EP | 2316727 A1 | 5/2011 |
| EP | 3176076 A1 | 6/2017 |
| GB | 0224538 A | 6/1925 |
| GB | 298508 A | 10/1928 |
| GB | 00404149 A | 1/1934 |
| GB | 1492177 A | 11/1977 |
| GB | 2204538 A | 11/1988 |
| JP | 2011515277 A | 5/2011 |
| JP | 2012501895 A | 1/2012 |
| RU | 2497717 C2 | 11/2013 |
| WO | 2009118547 A2 | 10/2009 |
| WO | 2010/026410 | 3/2010 |

OTHER PUBLICATIONS

German Search Report for Application No. 10 2017 123 701.1 dated Feb. 27, 2018; 7 pages (p. 2 categorizing cited references).

International Search Report including Written Opinion for Application No. PCT/EP2018/060809 dated Jun. 20, 2018; 16 pages.

Search Report dated Jun. 27, 2022 from Office Action for Chinese Application No. 201880022511.X dated Jul. 4, 2022. 2 pgs.

International Search Report from PCT/EP2018/059763 dated Jun. 5, 2018.

Search Report dated Aug. 25, 2022 from Office Action for Chinese Application No. 2018800215744 dated Sep. 1, 2022. 3 pages.

WING FOR AN AIRCRAFT

CROSS-REFERENCE TO RELATED APPLICATIONS

The present application is a national phase entry under 35 U.S.C. § 371 of International Application No. PCT/EP2018/059763 filed Apr. 17, 2018, published in English, which claims priority from German Patent Application No. 10 2017 004 090.7 filed Apr. 28, 2017 and German Patent Application No. 10 2017 124 793.9 filed Oct. 24, 2017, all of which are incorporated herein by reference.

FIELD OF THE INVENTION

The present invention relates to a wing for an aircraft.

BACKGROUND OF THE INVENTION

The wing comprises a main wing having an outer skin defining an interior space of the main wing, a slat and a connection assembly for movably connecting the slat to the main wing, such that the slat is movable in a predefined motion between a retracted position and at least one extended position. The retracted position is preferably the position of the slat for cruise flight. In an example, one extended position of the slat may refer to the position of the slat for a takeoff. In an even further example, at least one extended position of the slat may be a position of slat for landing. The connection assembly may be configured such that the slat is movable in a predefined motion between the retracted position and the least one extended position, or vice versa.

Wings often employ a slat track to movably connect the slat to the main wing. The slat is usually connected to a first end section of the slat track, such that a movement of the slat track results in a corresponding movement of the slat, preferably a long a predetermined a pathway. In order to achieve a higher lift effect of the wing, the slat will be moved to the extended position, for instance for takeoff or landing. In particular during cruise flight, the slat is moved back to the retracted position. The movement between the retracted position and the at least one extended positional is supported and/or ensured by the connection assembly. The connection assembly, however, may require a considerable space in the leading edge portion of the main wing, such that a front spar of the main wing usually has to be penetrated by the slat track, when the slat is move to the retracted position. In order to allow the slat track to penetrate the front spar of the main wing, an opening in the front spar may be necessary. However, the area behind the front spar of the main wing usually servers as the area for the fuel tank. As the result, a one side opened tube like space may be provided beginning with the opening in the front spar. This space may then serve for receiving the part of the slat track penetrating the front spar, when the slat is in the retracted position. As a result, a construction of the main wing with a possibility for a slat track to penetrate the front spar of the main wing may be of a complex construction.

BRIEF SUMMARY OF THE INVENTION

Accordingly, an object of the present invention may be to provide a wing for an aircraft with a more compact connection assembly, which is configured for movably connecting the slat to the main wing. In particular, it may be advanced, if the connection assembly is configured, such that the slat track does not penetrate the front spar, if the slat is in the retracted position.

According to a first aspect of the present invention, the object is solved by the subject-matter of claim 1. Thus, the object is achieved by a wing of an aircraft, wherein the wing comprises a main wing having an outer skin defining an interior space of the main wing, a slat, and a connection assembly for movably connecting the slat to the main wing, such that the slat is movable in a predefined motion between a retracted position and at least one extended position. The connection assembly further comprises an elongate and curved slat track. A first end section of the slat track is connected to the slat. The connection assembly further comprises a first bearing, which is arranged within the interior space of the main wing. The connection assembly even further comprises a second bearing, which is spaced apart from the first bearing and at least partly arranged outside the interior space of the main wing. The slat track is movably and rotatably supported on the main wing by the first and second bearing, such that the first and second bearing support the predefined motion.

As a result, the first bearing and the second bearing are used to at least indirectly support the slat on the main wing, such that the slat is movable relative to the main wing between the retracted position and the at least one extended position. The first bearing is arranged within, in particular fully within, the interior space of the main wing. The second bearing, however, is at least partly ranged outside the interior space of the main wing. As an effect, both, the the first bearing and the second bearing, can be arranged close to the forward leading edge of the main wing.

Furthermore, the slat track is configured as a curved slat track. As an effect, the slat track may be designed with a short length along is curved shape and/or with small outer dimensions. In other words, the slat track may be compact. Thus, the slat track may comprise a curved outer shape and/or a curved center line. The curvature of the slat track may relate to the whole slat track as such or at least to a part or section of the slat track. For instance, the slat track may comprise a curved shape section, which is configured to engage with the first and second bearing. The remaining section of the slat track may be of a different shape. For instance, a second end section and/or a intermediate section of the slat track may comprise a curved outer shape and/or a curved center line. However, the slat track may also be fully curve resulting in a fully curved outer shape and/or a fully curved center line.

As a result of the curvature of the slat track and the arrangement of the first and second bearing, the slat may be moved from an extended position to the retracted position without requiring a large space for the slat track in the leading edge portion of the main wing. In particular, it may be possible that even in the retracted position, that there may be no need for the slat track to penetrate the front spar of the main wing. Instead, the slat track and the first and second bearing may be configured, that a second end section of the slat track is guided in a curved trajectory within the interior space of the main wing without penetrating the front spar. In this case, the front spar of the main wing may be of a reduced complexity and/or may even ensure a higher stiffness of the main wing.

Supporting the predefined motion of the slat may refer to the ability and/or configuration of the first bearing and the second bearing to guide the slat track and/or to keep the slat track movably/rotatably connected to the main wing during the predefined motion of the slat between the retracted position and the at least one extended position, or vice versa. In particular, this may refer to the configuration of the first bearing and the second bearing, such that the predefined motion can be ensured.

In a further example, the first end section of the slat track may be firmly connected to the slat. As a result, the slat may be a stationary fixed to the first end section of the slat track. However, other connections between the first end section of the slat track and the slat may also be possible.

According to a preferred embodiment of the wing, the slat track comprises a second end section, which may be opposite to the first end section. In an example, the second end section of the slat track is movably and rotatable connected to the second bearing, such that the second end section of the slat track is movable along a predefined pathway defined by the second bearing while being connected to the main wing via the guide.

In an example, the second bearing may be configured to movably and rotatably connect the second end section of the slat track along the predefined, curved pathway. For instance, the second bearing may be configured as a slide guide, a roller guide or another guide being configured to fulfill the respective function as preferably described before.

According to a preferred embodiment of the wing, an intermediate section of the slat track is movably and rotatably supported on the main wing by the first bearing. The intermediate section of the slat track may refer to a section of the slat track being arranged between the first end section of the slat track and the second end section of the slat track. However, the intermediate section of the slat track does not necessary attach to the first end section and/or the second end section.

According to a preferred embodiment of the wing, the intermediate section of the slat track comprises a constant cross profile. Thus, intermediate section of the slat track may comprise a constant outer dimension, in particular a constant outer diameter and/or in particular a constant inner diameter, along the curved contour of the intermediate section. In an example, the intermediate section of the slat track comprises a constant height in a radial direction of the slat track. Resulting from the curved shape, the preferred constant outer diameter and/or the constant height, the first bearing may be configured to ensure continuous engagement with the intermediate section of the slat track. As a result, a backlash-free connection may be provided between the first bearing and the slat track.

According to a preferred embodiment of the wing, the main wing comprises a front spar, such that the front spar and the outer skin of the main wing define a front portion of the interior space, wherein the second bearing is fully arranged within the front portion of the interior space. As an effect, the second bearing, in particular configured as a roller guide, does not penetrate the outer skin of the main wing and/or does not penetrate the front spar of the main wing. Accordingly, the second bearing would not require an increased complexity of the front spar of the main wing or a higher complexity of the outer skin. As an even further effect, the leading portion of the main wing can be constructed with less complexity.

According to a further preferred embodiment of the wing, the connection assembly and the slat track are configured, such that a second end section of the slat track remains within the front portion of the interior space of the main wing, if the slat is moved to the retracted position. By means of the connection assembly, the slat may be moved relative to the main wing from an extended position to the retracted position. As a result, the slat track is retracted towards the interior space of the main wing and/or into the interior space of the main wing. As described in the introduction, this has been led in the prior art to a penetration of the front spar. However, the connection assembly and the slat track of the present invention are configured, such that the second end section of the slat track remains within the front portion of the interior space of the main wing, even if the slat is moved to the retracted position. Thus, the slat track would not penetrate the front spar. The main wing, in particular the front spar, may therefore be constructed with less complexity.

According to a further preferred embodiment of the wing, the second bearing is configured as an elongated guide, in particular an elongated roller bearing guide, being arranged within the main wing, wherein the second end section of the slat track is movably and rotatably connected to the guide, such that the second end section of the slat track is movable along a predefined pathway, in particular curved pathway, defined by the guide while being connected to the main wing via the guide. As a result, the guide may be configured to guide the second end section of the slat track, such that is passed inside the interior space, in particular inside the front portion of the interior space, such that the second end section of the slat track does not penetrate or hit the front spar of the main wing. Instead, the guide may be configured to ensure that the second end section remains inside the front portion of the interior space of the main wing.

According to a further preferred embodiment of the wing, the guide is a curved guide, such that at least a section of the pathway is curved. In an example, the total pathway may be curved or the pathway may be fully curved. Preferably, the curvature of the pathway is constant. In another example, however, curvature may not be constant. Instead, different sections of the pathway may have different curvature. In a further example, at least a section of the pathway is curved. Thus, another section of the pathway may not be curved, even though the guide is a curved guide. In an example, the guide may comprise a part having a straight form and at least on part having a curved form, such that the corresponding pathway defined by the guide may comprise a section, which is a straight section, and at least one further section, which is a curved, in particular fully curved, section. The curved guide and the resulting pathway as a curved pathway may provide the advantage that a movement of the slat via the connection assembly would avoid collusion between the slat and the main wing while providing further advantages. For example, the connection assembly, in particular its curved guide, may be configured such that the slat at least basically is moved continuously forward and downward, such that the slat may be downward and forward of the forward leading edge of the main wing, if the slat is in an extended position. In a further example, the connection assembly, in particular its curved guide, may be configured such that the slat at least basically is initially moved forward and thereafter moved in a combined movement downwards and forward, such that the slat may be downward and forward of the forward leading edge of the main wing, if the slat is in an extended position. Furthermore, the curvature of the pathway may be adapted, such that at least two extended positions may be reached along the pathway, one after the other. One of the extended positions may refer to the take-off position of the slat, wherein the other extended position may relate to the landing position of the slat, or vice versa.

According to a further preferred embodiment of the wing, the guide and the slat track are configured, such that a curvature of the pathway coincides with a curvature of the slat track. The curvature of the pathway may correspond or may be referred to as the curved centerline of the pathway. The curvature of the slat track may correspond or may be referred to as the curved centerline of the slat track. Thus, the slat track may be guided by the connection assembly, in particular the first bearing and the guide (as the second bearing), in order to support the predefined motion of the slat, such that a trajectory of the slat track, and thus its curvature or centerline, would coincide with the curvature or centerline of the pathway. As an effect, the connection assembly may just require a considerable small space of the front portion of the interior space of the main wing.

According to a further preferred embodiment of the wing, the guide is configured as a roller bearing guide. Such a roller bearing guide may also be a curved guide. Thus, reference may be made with respect to the previously provided explanations in an analogous manner. A roller bearing guide may further provide the advantage of a lower friction. For example, the roller bearing guide may comprise a guidance rail and a guidance roller. The guidance roller may be rotatably connected to the second end section of the slat track and further engages with the guidance rail, such that the guidance rail guides the guidance roller along the pathway defined by the guide. The guidance rail may be a curved guidance rail, in particular a at least partly curved guidance rail or a fully curved guidance rail. The curvature of the guidance rail may characterize the curvature of the guide. As an effect, the guidance rail and the guidance roller may engage with each other, such that the second end section of the slat track is movable along a curved pathway of the guide while being connected to the main wing via the guide.

According to a further preferred embodiment of the wing, the first bearing is configured as a roller bearing comprising a roller pair, wherein at least one roller of the roller pair is at least partly arranged outside the interior space of the main wing. In an example, one roller of the roller pair is partly or fully arranged outside the interior space of the main wing. Thus, said roller may be fully or partly arranged outside and/or above the leading edge portion of the main wing. The other roller of the roller pair may be arranged inside the interior space of the main wing. However, in an example, also the other roller of the roller pair may be partly or fully arranged outside the interior space of the main wing.

According to a further preferred embodiment of the wing, the intermediate section of the slat track is guided by the roller pair, such that each roller of the roller pair supports an opposite side of the intermediate section of the slat track. As an effect, a high guidance ability may be ensured.

According to a further preferred embodiment of the wing, the slat track comprises an H-cross-profile or an U-cross-profile resulting in at least one groove, wherein the roller pair engages with at least one groove.

According to a further preferred embodiment of the wing, a cover element is arranged outside the outer skin of the main wing, such that the cover element at least partly covers at least a part of the first bearing being arranged outside the interior space of the main wing. The cover element may be referred to as a protective plate or a guard plate. As an effect, shelter may be kept away from the part of the first bearing being arranged outside the interior space of the main wing. As an effect, the operation of the first bearing may be ensured with higher reliability.

According to a second aspect of the present invention, the object of the present invention may be solved by an aircraft comprising the features of claim 14. Thus, the object may be achieved by an aircraft comprising at least one wing as described in the context of the first aspect of the present invention.

It is to be noted, that the preferred embodiments, features, effects and/or advantages, even though described previously in the context of the wing according to the first aspect of the present invention, may also relate in an analogous manner to the aircraft according to other second aspect of the present invention, at least in an analogous manner.

According to a third aspect of the present invention, the object of the present invention may be solved by a connection assembly comprising the features of claim 14. Thus, the object is achieved by a connection assembly for movably connecting the slat to a main wing of an aircraft, such that the slat is movable in a predefined motion between a retracted position and at least one extended position. The connection assembly comprises an elongate and curved slat track. A first end section of the slat track is configured to be connected to the slat, wherein the connection assembly comprises a first bearing, which is configured to be mechanically connected to at least one structural component of the main wing, such that the first bearing at least partly arranged outside the interior space of the main wing. The connection assembly comprises a second bearing, which is spaced apart from the first bearing and is configured to be mechanically connected to at least one inner structural component of the main wing, such that the second bearing is arranged within the interior space of the main wing. The slat track is movably and rotatably supported by the first and second bearing, such that the first and second bearing support the predefined motion.

It is understood that, without repeating here all the explanations, examples, features, effects and/or advantages provided with reference to the wing for the aircraft, the connection assembly as such according to the third aspect of the present invention is intended to be configured to be connected to the structural components of the main wings, such that the effects of the wing comprising the respective connection assembly according to the first aspect of the invention can be provided. Thus, all the above provided examples, explanations, features, effects and/or advantages, although provided with reference to the connection assembly of the wing according to the first aspect of the invention, are also to be intended as being provided in an analogous manner for the connection assembly according to the third aspect of the present invention, in particular for at least one of the following embodiments of the connection assembly.

In an example, a structural component of the main wing may also be referred to as a wing structure. In a further example, the structural component may be at least one of a spar of the main wing, a rib of the main wing and/or a stringer of the main wing.

According to a preferred embodiment of the connection assembly, the connection assembly is configured to be mechanically connected to a leading edge rib of the main wing, a forward leading end section of a rib of the main wing, a leading edge skin, a forward leading end section of the skin, and/or a front spar.

According to a preferred embodiment of the connection assembly, an intermediate section of the slat track is movably and rotatably supported by the first bearing.

According to a further preferred embodiment of the connection assembly, wherein the intermediate section of the slat track comprises a constant cross profile.

According to a further preferred embodiment of the connection assembly, the connection assembly is configured, such that the second bearing of the connection assembly is fully arrangeable within a front portion of the interior space of the main wing, wherein the main wing comprises a front spar, such that the front spar and the outer skin of the main wing define the front portion of the interior space.

According to a further preferred embodiment of the connection assembly, the connection assembly and the curved slat track are configured, such that a second end section of the slat track remains within the front portion of the interior space, if the slat is moved to the retracted position.

According to a further preferred embodiment of the connection assembly, the second bearing is configured as an elongated guide for being arranged within the main wing, wherein the second end section of the slat track is movably and rotatably connected to the guide, such that the second end section of the slat track is movable along a predefined pathway defined by the guide while being connectable to the main wing via the guide.

According to a further preferred embodiment of the connection assembly, the guide is a curved guide, such that at least a section of the pathway is curved.

According to a further preferred embodiment of the connection assembly, the guide and the slat track are configured, such that a curvature of the pathway coincides with a curvature of the slat track.

According to a further preferred embodiment of the connection assembly, the guide is configured as a roller bearing guide.

According to a further preferred embodiment of the connection assembly, the first bearing is a roller bearing comprising a roller pair, wherein the first bearing is configured to be mechanically connected to at least one structural component of the main wing, such that at least one roller of the roller pair is at least partly arrangeable outside the interior space of the main wing.

According to a further preferred embodiment of the connection assembly, the intermediate section of the slat track is guided by the roller pair, such that each roller of the roller pair supports an opposite side of the intermediate section of the slat track.

According to a further preferred embodiment of the connection assembly, the slat track comprises an H-cross-profile or a U-cross-profile resulting in a least one groove, wherein the roller pair engages with the at least one groove.

BRIEF DESCRIPTION OF THE DRAWINGS

Further features, advantages and application possibilities of the present invention may be derived from the following description of exemplary embodiments and/or the drawings. Thereby, all described and/or visually depicted features for themselves and/or in any combination may form an advantageous subject matter and/or features of the present invention independent of their combination in the individual claims or their dependencies. Furthermore, in the drawings, same reference signs may indicate same or similar objects.

FIG. 1 schematically illustrates the wing (2) for an aircraft (1) in a cross-sectional view according to a preferred embodiment of the present invention. An example of an aircraft (1) is schematically illustrated in FIG. 4.

Figure 1:
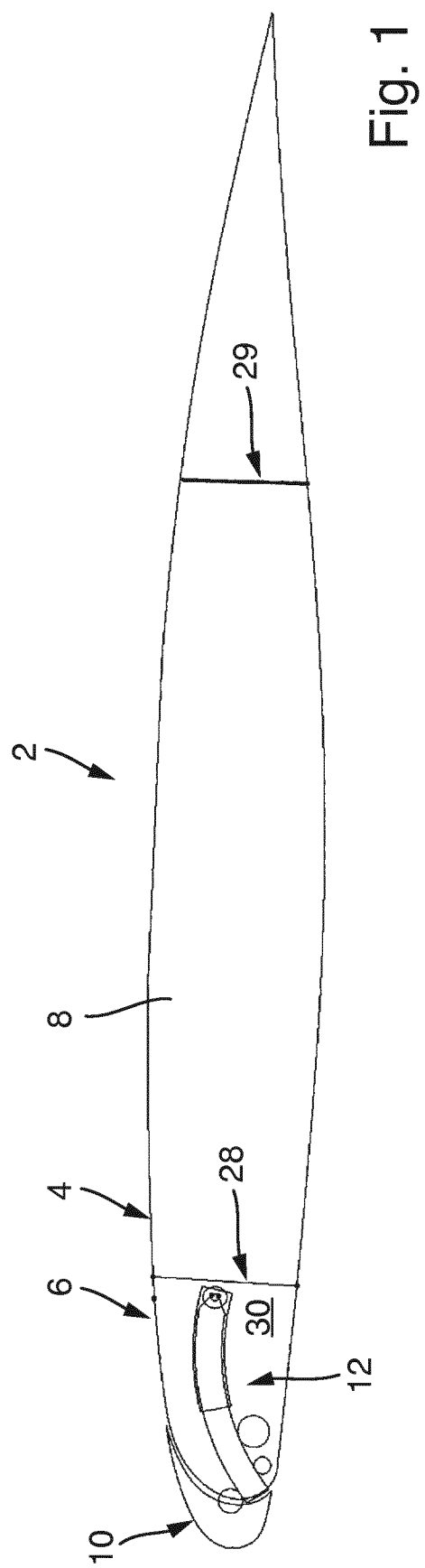
FIG. 1 schematically illustrates a cross-sectional view across the wingspan direction of a first embodiment of the wing for an aircraft according to the present invention.

The wing (2) comprises the main wing (4), a connection assembly (12) and a slat (10). An outer skin (6) of the main wing (4) defines an interior space (8) of the main wing (4). The interior space (8) is preferably divided by rips and spars (28, 29). In an example, the main wing (4) comprises at least a front spar (28) and a rear spar (29). Thus, the front spar (28) and the outer skin (6) of the main wing (4) preferably define a front portion (30) of the interior space (8).

Figure 2:
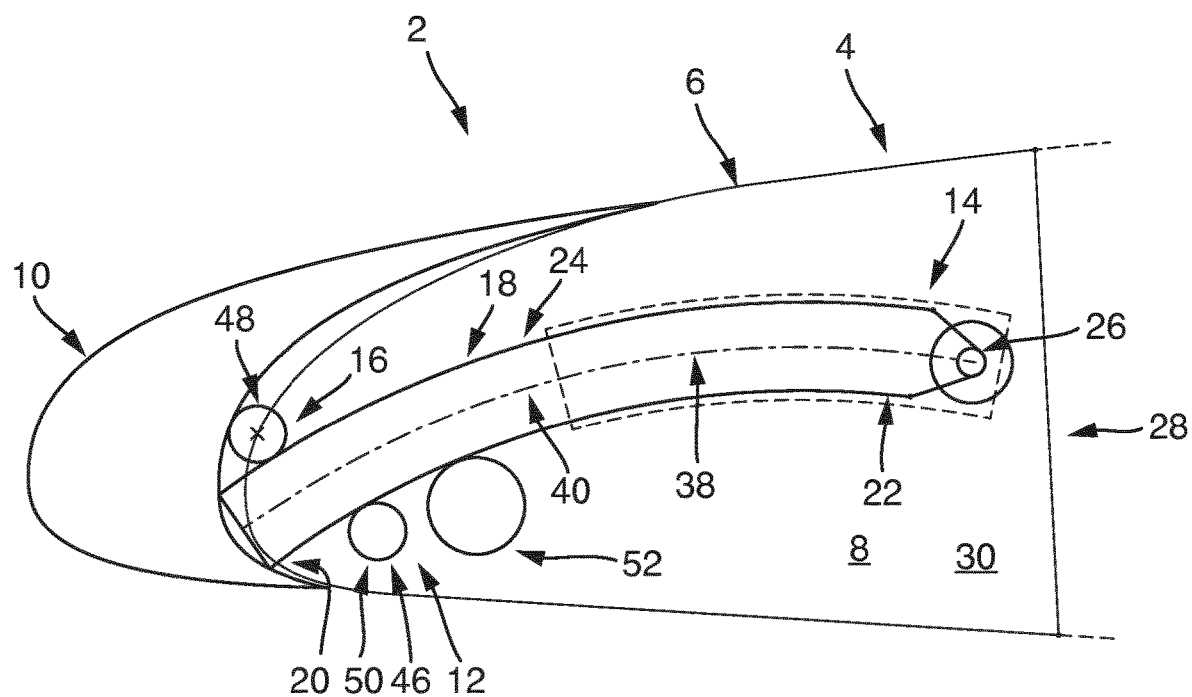
FIG. 2 schematically illustrates a cross-sectional view across the wingspan direction of a second embodiment of a part of the wing for an aircraft according to the present invention.
Figure 3:
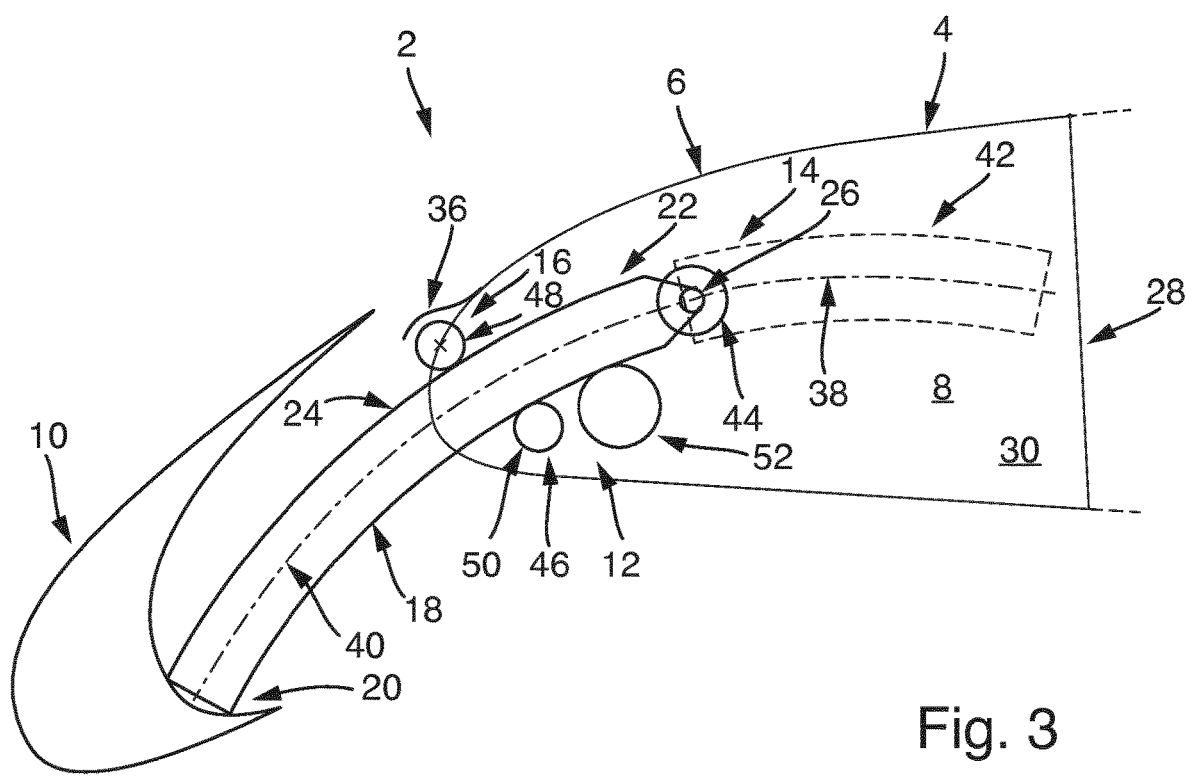
FIG. 3 schematically illustrates a cross-sectional view across the wingspan direction of a third embodiment of a part of the wing for an aircraft according to the present invention.
Figure 4:
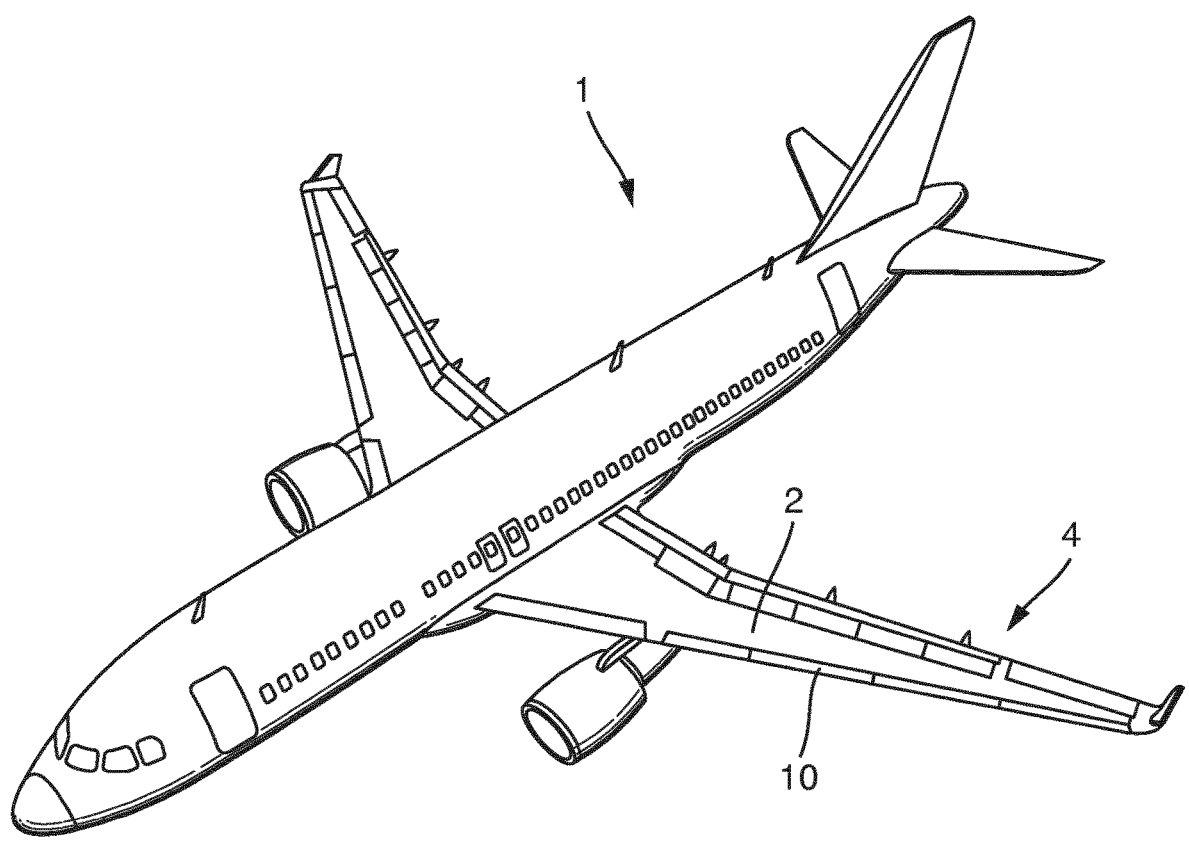
FIG. 4 schematically illustrates a view of an aircraft according to the present invention.

FIGS. 2 to 4 schematically illustrate embodiments of a forward leading portion of the wing (2), in particular a forward leading portion of the main wing (4), a connection assembly (12) and a slat (10), each in a cross-sectional view.

As exemplarily illustrated in FIG. 2, the connection assembly (12) is configured for movably connecting the slat (10) to the main wing (4). The connection assembly (12) is further configured, such that the slat (10) is movable relative to the main wing (4) in a predefined motion between a retracted position and at least one extended position. FIG. 2 schematically illustrates the slat (10) being moved to the retracted position.

FIG. 3 schematically illustrates basically the same wing (2) as illustrated in FIG. 2, however, the slat (10) is moved to an extended position. As a result, the connection assembly (12) allows to move and/or guide the slat (10) between the retracted position and the extended position, or vice versa.

The connection assembly (12) comprises a first bearing (16). The first bearing (16) is preferably configured as a roller bearing. The first bearing (16) is at least partly arranged outside the interior space (8) of the main wing (4).

The connection assembly (12) further comprises a second bearing (14). The second bearing (14) is arranged within, preferably fully within, the interior space (8) of the main wing (4). Further, the first bearing (16) and the second bearing (14) are spaced apart from each other. Each of the bearings (14, 16) may be mechanically fixed to at least one internal structural component of the main wing (4). For instance, each of the bearings (14, 16) may be fixed to at least one spar, at least one rib and/or at least one stringer.

The second bearing (14) is preferably configured as a elongate guide or as a elongate roller bearing guide. Thus, the second bearing (14) may also be referred to as a guide (14).

Furthermore, the connection assembly (12) comprises an elongate and curved slat track (18). Thus, the slat track (18) may be characterized by a curved outer shape and/or curved outer contour. In particular, the slat track may comprise a circular segment like cross-shape.

The slat track (18) is movably and rotatably supported on the main wing (4) by the first bearing (16) and the second bearing (14), in particular configured as a guide, such that the first and second bearing (14, 16) support the predefined motion of the slat (10), in particular between the retracted position and at least one extended position, or vice versa. During the predefined motion of the slat (10), the slat track (18) may be partly "driven out" of the interior space (8) of the main wing (4) or partly "driven in" into the interior space (8) of the main wing (4), respectively.

A first end section (20) of the slat track (18) is connected to the slat (10). This connection may be a firmly fixed connection. A further section of the slat track (18) may be movably and rotatably connected to the second bearing (14).

The further section of the slat track (18) may be a second end section (22) of the slat track (18). In case the second bearing (14) is configured as a guide, the second end section (22) of the slat track (18) may be movably and rotatably connected to the guide (14), such that the second end section (22) of the slat track (18) is movable along a predefined pathway defined by the guide (14) while being connected to the main wing (4) via the guide (14).

Further, an intermediate section (24) of the slat track (18) may be movably and rotatably supported on the main wing (4) by the first bearing (16), in particular such that the first bearing (16) and the second bearing (14) support the predefined motion of the slat (10). The intermediate section (24) of the slat track (18) may refer to a section of the slat track (18) being arranged between the first end section (20) of the slat track (18) and the second end section (22) of the slat track (18).

A connection point (26) may refer to the further section or second end section (22) of the slat track (18), where the slat track (18) is moveably connected to the second bearing (14). In case the second bearing (14) is configured as a guide, in particular as a roller bearing guide, the connection point (26) may move toward the first bearing (16), when the slat (10) moves from the retracted position to the extended position. In order to allow as low as possible forces acting on the first bearing (16) and/or the second bearing (14), in particular configured as the roller bearing guide, it is desirable to keep the distance between the connection point (26) and the first bearing (16) as large as possible.

It has been found that the distance between the connection point (26) and the first bearing (16) can be increased, in particular as large as possible, if at least a part of the first bearing (16) is arranged outside the interior space (8) of the main wing (4). In an example, at least a part of the first bearing (16) is extending forward to the forward leading edge of the main wing (4). As a further result of arrangement of the first bearing (16) such that at least being partly outside the interior space (8) of the main wing (4), the second bearing (14), in particular configured as the roller bearing guide, may be arranged closer to the forward leading edge of the main wing (4). As an effect, the length of the slat track (18) (along its curved center line) between the first end section (20) and the opposite, second end section (22) may be decreased and/or considerable short. In an example, the length of the slat track (18) may be limited to a length, such that the second end section (22) of the slat track (18) would not penetrate the front spar (28) of the main wing (4), if the slat (10) is moved to its retracted position, for instance as it is schematically illustrated in FIG. 2.

In an example, the main wing (4) comprises a front spar (28) such that the front spar (28) and the outer skin (6) of the main wing (4) define a front portion (30) of the interior space (8). Thus, the front portion (30) of the interior space (8) may relate to the interior space (8) defined by a so call D-section of the main wing (4). It is preferred that the second bearing (14) is fully arranged within the front portion (30) of the interior space (8). Thus, the second bearing (14), in particular configured as the roller bearing guide, may not penetrate the outer skin (6) and/or may not penetrate the front spar (28) of the main wing (4).

In case the second bearing (14) is configured as the roller bearing guide (14), the second end section (22) of the slat track (18) may be movably and rotatably connected to the roller bearing guide (14), such that the second end section (22) of the slat track (18) is movable along the predefined pathway, in particular curved pathway, defined by the roller bearing guide (14). As a result, the second end section (22) of the slat track (18) is prevented from being penetrated through the outer skin (6) of the main wing (4) and/or prevented from being penetrated through the front spar (28). Instead, the connection assembly (12) and the slat track (18) may be configured, such that the second end section (22) of the slat track (18) remains (in particular always) within the front portion (30) of the interior space (8), in particular even if the slat (10) is moved to the retracted position.

As an effect, the slat track (18) not penetrating the front spar (28) results in a reduced complexity of the wing (2), in particular the main wing (4). At the same time, mechanical requirements may be met, since the bearing (16) is at least partly arranged outside the interior space (8), in particular outside the front portion (30) of the interior space (8). This results in the effect, that a, in particular predefined, minimum distance between the bearing (16) and the second end section (22) of the slat track (18) or the connection point (26) may be ensured. Thus, the mechanical forces applied to the bearing (16) and/or the guide (14) during the operation of the wing (2) may be limited to an acceptable amount.

It has been found of advantage, if the second bearing (14) is configured as a curved guide, in particular as a curved roller bearing guide (14), which is schematically illustrated in FIGS. 1 and 2. The curved guide (14) may by characterize in that at least a section of the pathway is curved. As schematically illustrated in FIGS. 1 and 2, the pathway defined by the roller bearing guide (14) may not comprise a straight section, but may be fully curved. In an example, the roller bearing guide (14) and the slat track (18) are configured, such that a curvature of the pathway defined by the roller bearing guide (14) coincides with a curvature of the slat track (18). As a result, the curved center line (40) of the slat track (18) would move along a trajectory, which coincide with a curved centerline (38) of the roller bearing guide (14). Accordingly, the connection assembly would require as little as possible space within the front portion (30) of the interior space (8) of the main wing (4).

It has been found of advantage, if at least the part of the first bearing (16) being arranged outside the interior space (8) of the main wing (4) is protected from shelter. In an example, a cover element (36) is arranged outside the outer skin (6) of the main wing (4), such that the cover element (36) at least partly covers at least a part of the first bearing (16) being arranged outside the interior space (8) of the main wing (4). Thus, the cover element (36) may be arranged outside the outer skin (6) of the main wing (4) and above the part of the first bearing (16) extending outside the outer skin (6) of the main wing (4). As an effect, the reliability of the first bearing (16) may be increased.

As indicated earlier, the second bearing (14) may be configured as a roller bearing guide (14). For example, the roller bearing guide (14) may comprise a guidance rail (42) and a guidance roller (44). The guidance roller (44) may be rotatably connected to the second end section (22) of the slat track (18) and further engages with the guidance rail (42), such that the guidance rail (42) guides the guidance roller (44) along the (preferably curved) pathway defined by the roller bearing guide (14). As an effect, the guidance rail (42) and the guidance roller (44) may engage with each other, such that the second end section (22) of the slat track (18) is movable along the predefined pathway of the roller bearing guide (14) while being connected to the main wing (4) via the guide (14).

In a further example, the first bearing (16) may be configured as a roller bearing (16). The roller bearing (16) may comprise a roller pair (46). The roller pair (46) may comprise a first roller (48) and a second roller (50). As schematically indicated in the FIGS. 1-2, it may be preferred, that at least the first roller (48) of the roller pair (46) is at least partly arranged outside the interior space (8) of the main wing (4). As a result, the first bearing (16) comprising the roller pair (46) may be arranged in an area close to the forward leading edge of the main wing (4).

In a further example, the intermediate intersection (24) of the slat track (18) is guided by the roller pair (46), such that each roller (48, 50) of the roller pair (46) supports an opposite side of the intermediate section (24) of the slat track (18). As a result, a well-defined guidance for the slat track (18) may be provided.

According to a further preferred example, the wing (2) may comprise a drive unit (52). The drive unit (52) may be arranged in the interior space (8), in particular in the front portion (30) of the interior space (8) of the main wing (4). The drive unit (52) is preferably configured to directly or at least indirectly drive the slat track (18), such that the slat track (18) can be driven in order to move the slat (10) between the retracted position and the at least one extended position or vice versa.

According to a further example, an aircraft (i) may comprise a wing (2) as exemplary described above. An aircraft (i) is schematically illustrated in FIG. 4.

The invention claimed is:

1. A wing for an aircraft, comprising:
   a main wing having an outer skin defining an interior space of the main wing,
   a slat, and
   a connection assembly for movably connecting the slat to the main wing, such that the slat is movable in a predefined motion between a retracted position and at least one extended position,
   wherein the connection assembly comprises an elongate and curved slat track,
   wherein a first end section of the slat track is connected to the slat,
   wherein the connection assembly comprises a first bearing at least partly arranged outside the interior space of the main wing,
   wherein the connection assembly comprises a second bearing spaced apart from the first bearing and arranged within the interior space of the main wing, wherein the second bearing comprises a guidance rail and a guidance roller configured to engage move along the guidance rail, and
   wherein the slat track is movably and rotatably supported on the main wing by the first and second bearing, such that the first and second bearing support the predefined motion.

2. The wing according to the claim 1, wherein an intermediate section of the slat track is movably and rotatably supported on the main wing by the first bearing.

3. The wing according to claim 2, wherein the intermediate section of the slat track comprises a constant cross profile.

4. The wing according to claim 1, wherein the main wing comprises a front spar, such that the front spar and the outer skin of the main wing define a front portion of the interior space, wherein the second bearing is fully arranged within the front portion of the interior space.

5. The wing according to claim 4, wherein the connection assembly and the curved slat track are configured, such that a second end section of the slat track remains within the front portion of the interior space, if the slat is moved to the retracted position.

6. The wing according to claim 1, wherein the second bearing is configured as an elongated guide arranged within the main wing, wherein the second end section of the slat track is movably and rotatably connected to the guide, such that the second end section of the slat track is movable along a predefined pathway defined by the guide while being connected to the main wing via the guide.

7. The wing according to claim 6, wherein the guide is a curved guide, such that at least a section of the pathway is curved.

8. The wing according to claim 7, wherein the guide and the slat track are configured, such that a curvature of the pathway coincides with a curvature of the slat track.

9. The wing according to claim 6, wherein the elongated guide is configured as a roller bearing guide.

10. The wing according to claim 1, wherein the first bearing is a roller bearing comprising a roller pair, wherein at least one roller of the roller pair is at least partly arranged outside the interior space of the main wing.

11. The wing according to claim 10, wherein the intermediate section of the slat track is guided by the roller pair, such that each roller of the roller pair supports an opposite side of the intermediate section of the slat track.

12. The wing according to claim 11, wherein the slat track comprises an H-cross-profile or a U-cross-profile resulting in a least one groove, wherein the roller pair engages with the at least one groove.

13. The wing according to claim 1, wherein a cover element is arranged outside the outer skin of the main wing, such that the cover element at least partly covers at least a part of the first bearing being arranged outside the interior space of the main wing.

14. An aircraft comprising at least one wing according to claim 1.

15. The wing according to claim 1, wherein a second end section of the slat track is rotatably connected to the guidance roller, and
   wherein the guidance rail is configured to guide the guidance roller along a pathway defined by the second bearing.

16. A connection assembly for movably connecting a slat to a main wing of an aircraft, such that the slat is movable in a predefined motion between a retracted position and at least one extended position,
   wherein the connection assembly comprises an elongate and curved slat track,
   wherein a first end section of the slat track is configured to be connected to the slat,
   wherein the connection assembly comprises a first bearing configured to be mechanically connected to at least one structural component of the main wing, such that the first bearing at least partly arranged outside the interior space of the main wing,
   wherein the connection assembly comprises a second bearing spaced apart from the first bearing and configured to be mechanically connected to at least one inner structural component of the main wing, such that the second bearing is arranged within the interior space of the main wing,
   wherein the second bearing is coupled at a second end section of the slat track, and
   wherein the slat track is movably and rotatably supported by the first and second bearing, such that the first and second bearing support the predefined motion.

* * * * *